July 26, 1927.
B. A. YARRINGTON
1,636,729
FILING MACHINE OR JIG SAW
Filed April 2, 1926   3 Sheets-Sheet 1
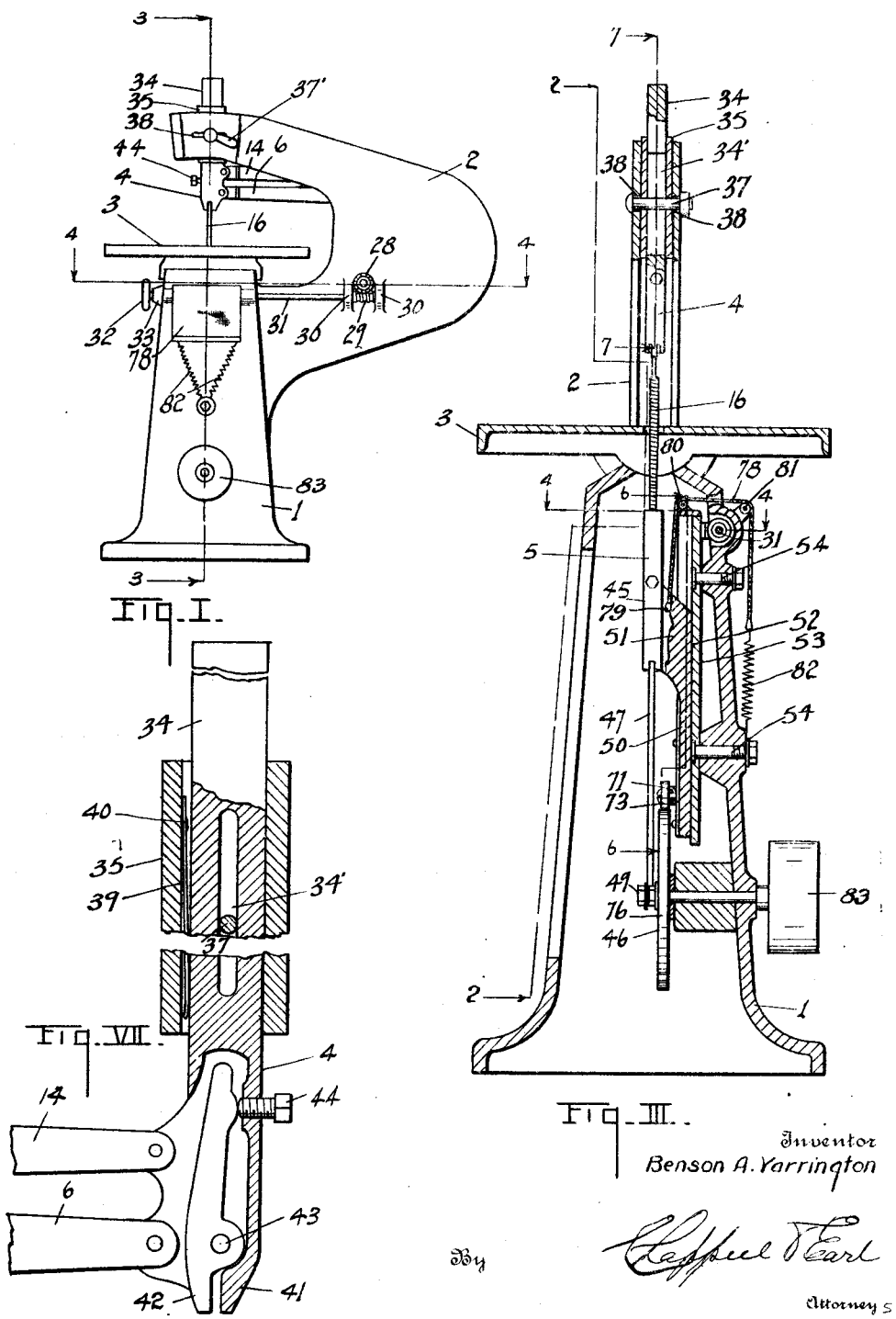
Inventor
Benson A. Yarrington

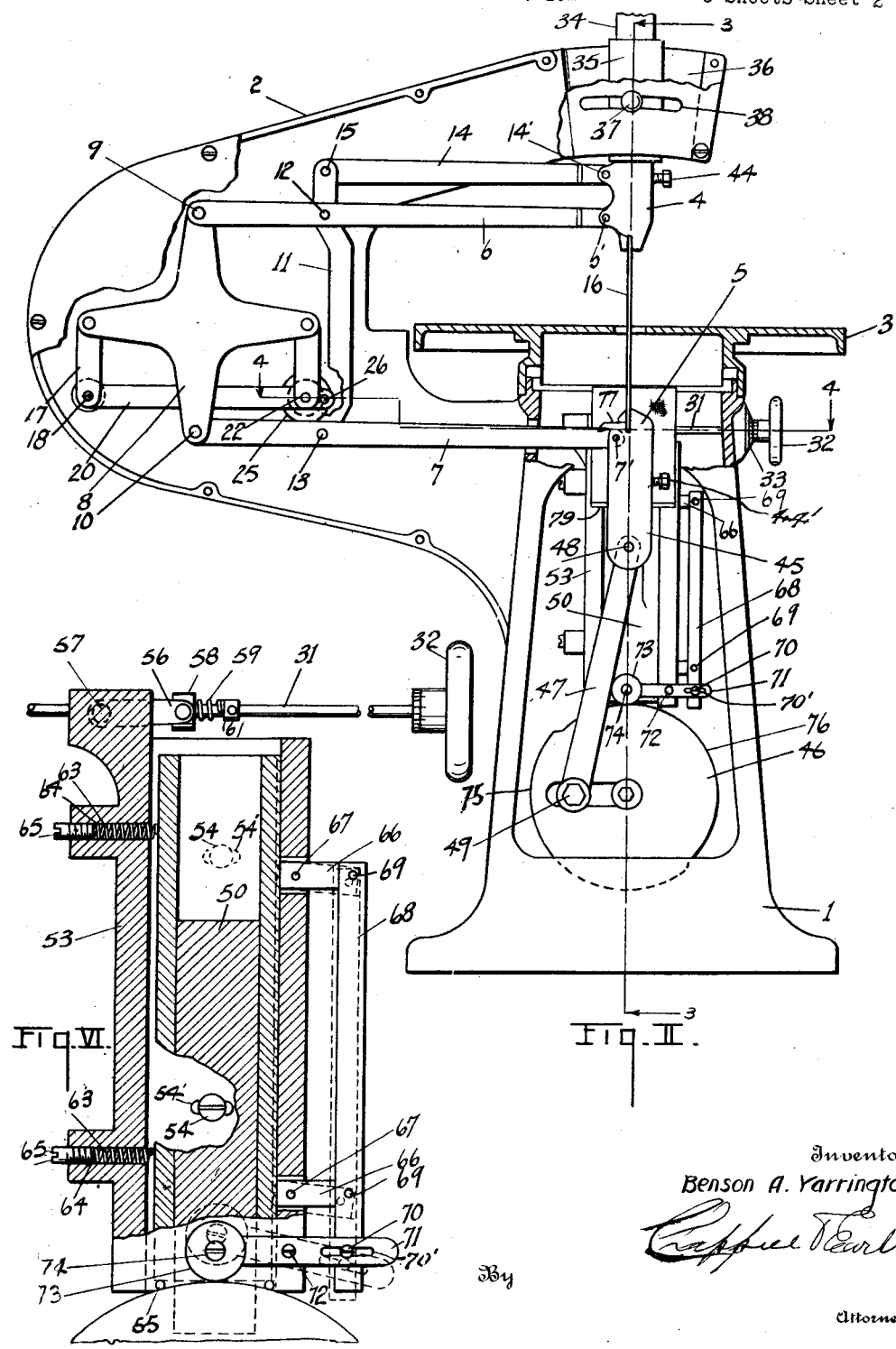

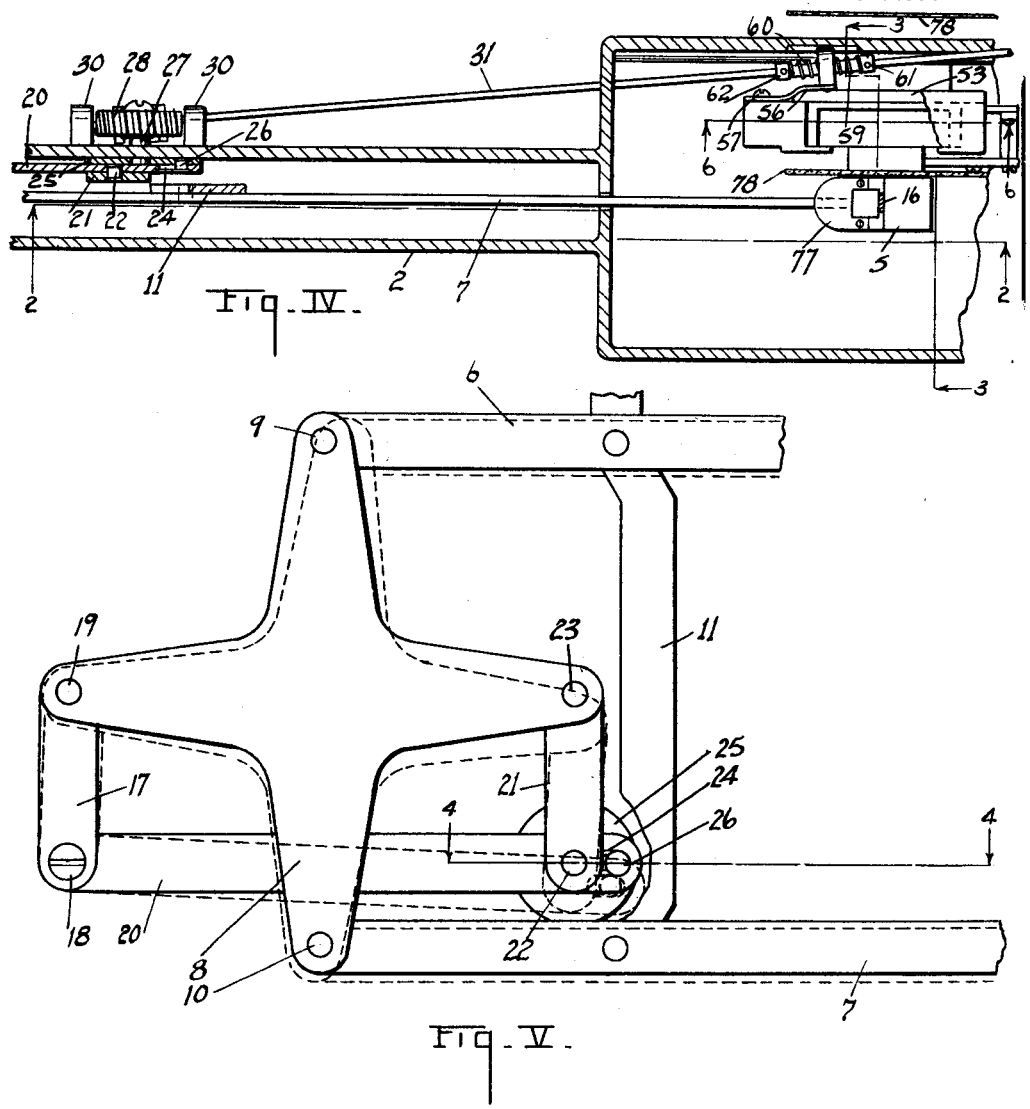

Patented July 26, 1927.

1,636,729

UNITED STATES PATENT OFFICE.

BENSON A. YARRINGTON, OF GRAND RAPIDS, MICHIGAN.

FILING MACHINE OR JIG SAW.

Application filed April 2, 1926. Serial No. 99,409.

This invention relates to improvements in filing machines or jig saws, the invention being adapted to both uses.

The objects of the invention are:

First, to provide an improved movement for such a machine in which the parallel action of a file or saw is maintained.

Second, to provide such an improved movement which is readily capable of adjustment to and from perpendicular.

Third, to provide an improved guiding means for the file or saw clamps.

Fourth, to provide an improved means of relieving the file or saw on its return stroke and advancing it to the work.

Objects pertaining to details and economies of construction and operation will appear from the detailed description to follow. The invention is defined and pointed out in the claims.

A structure which is a preferred embodiment of my invention is illustrated in the accompanying drawing, forming a part of this specification, in which:

Fig. I is a side elevation view from the right hand side of the machine.

Fig. II is an enlarged detail side elevation view partially in section, taken on the irregular section line 2—2 of Fig. III, showing various details, a portion of the case being broken away to show details of construction and operation.

Fig. III is a detail sectional view on the irregular line 3—3 of Figs. I, II and IV, certain parts being shown in full lines for the sake of clearness.

Fig. IV is an enlarged detail sectional plan taken on the irregular plane defined by lines 4—4 in Figs. I, II, III, and V.

Fig. V is an enlarged detail view of the parallel arms and supporting means appearing in Fig. II considerably enlarged, the adjustment thereof being indicated by dotted lines.

Fig. VI is an enlarged detail sectional view on the plane indicated by the irregular line 6—6 of Figs. III and IV, showing details of the mechanism for relieving the file or saw on the return stroke and of forcing to the work.

Fig. VII is an enlarged detail sectional view, certain parts being shown in full lines, of the upper saw or file clamp and guiding means, taken on a line corresponding to line 7—7 of Fig. III.

In the drawing all of the sectional views are taken looking in the direction of the little arrows at the ends of the section lines, and similar numerals of reference refer to similar parts throughout the several views.

Referring to the numbered parts of the drawing, 1 is the base, 2 is the main supporting arm, and 3 the tilting table which may be of any usual or desired form. 4 is the upper file or saw clamp, 5 is the lower saw or file clamp which engage and support between them the file or saw 16.

To the upper clamp 4 is secured the horizontal arm 6 by the pivot 6' and to the lower saw clamp is secured the horizontal arm 7 by pivot 7', these arms 6 and 7 being arranged in parallel position and carried at their rear ends by the cross-shaped cross support 8, arm 6 being supported by pivot 9 and arm 7 by pivot 10.

A cross arm 11 is connected in parallel relation to the cross piece 8 by pivots 12 and 13 at the upper and lower arm respectively.

A parallel link 14 is disposed parallel to the arm 6 and is connected at its rear end by pivot 15 to the upper end of the cross arm 11 and at its forward end by pivot 14' to the upper clamp 4.

The rear end of the horizontal cross arm of the cross piece 8 is supported on the vertical link 17 which is pivoted to the arm 2 by the pivot screw 18 and is pivotally connected at 19 to the said horizontally extending arm.

Horizontal link 20 is pivoted at its rear end at 18 and an upright link 21 which is parallel to the link 17 is pivotally connected to the horizontal link 20 at 22 at its lower end and by the pivot 23 to the forwardly extending arm of the cross piece 8. The forward end of the link 20 contains slot 24. An adjustable disk 25 is disposed back of the link 20 having a wrist pin 26 within the slot 24 for adjustment.

The disk 25 is carried by the short shaft 27 which carries worm gear 28 on the outer side of the said arm 2—see Figs. I and IV. This worm gear 28 is adjustable by the worm 29 which is supported in a pair of brackets 30, 30. The worm 28 is for adjustment. It is actuated by the spindle 31 which is provided with hand wheel 32 at the front of the machine. An indicating dial 33—see Figs. I and II, is provided to show the adjustment.

Upper clamp 4 is provided with a guiding shank or bar 34 which plays freely in the adjustable slideway 35. The slideway 35 is adjustable in the recess 36 in the upper end of the arm 2. A cross bolt 37 is disposed through the slide and is adjustable back and forth in the curved slots 38, being clamped by the wing nut 37'—see Fig. I.

Bolt 37 extends through a longitudinal slot 34' in the said shank or guide bar 34 and the guide bar is held yieldingly towards the front of the said slideway by the pressure spring 39 riveted to the said guide at 40—see Fig. VII.

There is a fixed jaw 41 at the lower end of the clamp which cooperates with the movable jaw 42 which is in the form of a lever fulcrumed at 43 and is forced to position by set screw 44—see Fig. VII.

A similar clamp means is provided in the lower clamp 5—see Fig. II.

The lower clamp 5 is provided with a shank 45 which is driven from the disk 46 by means of the pitman 47 connected thereto by the pivot 48 at its upper end and connected to the said disk 46 by the adjustable wrist pin 49 by which means the stroke of the file 16 or saw, when the saw is used, is regulated. The shank 45 is carried by the slide 50 which is connected thereto by a lateral arm or bracket 51 made integral therewith. This slide 50 is carried in the movable slide-way 52 which is carried on the adjustable support 53—see Figs. III, IV and VI, which is secured to the base by adjusting bolts 54, 54 disposed in transverse slots 54'—see full and dotted lines in Fig. VI. The adjustable slideway is retained on the support by the lug 55 at the bottom thereof—see Fig. VI.

The upper end of the support 53 carries the spring bracket 56 which is secured thereto by the screw 57 and carries a collar 58 at its outer end. This collar supports the spindle 31 of the adjusting worm, springs 59 and 60 being disposed on the opposite sides of the collar 58 and being retained in position by the collar 61, 62, which permits slight elastic adjustment of the said support 53.

The adjustable slideway 52 is forced to one side of the support by means of a pair of coiled springs 63 disposed in horizontal sockets or bores 64 in the wall of the support 53, the tension of the springs being adjustable by the set screws 65.

On the opposite side are disposed a pair of cam levers 66 pivoted in the support 53 by the pivots 67, the outer ends of which levers are connected together by bar 68 pivotally connected thereto in parallel relation at 69—69. The bar 68 is provided with a screw pin 70 at its lower end which is acted upon by the lever 71 which is slotted at 70' for the engagement of said screw 70. The opposite end of the lever carries a roller 73 journaled on the screw journal 74 and contacts with the peripheral cam shaped surface 75, 76 of the disk 46 so that on the down stroke the lever is in the horizontal position as indicated in Fig. VI, when the roller is on the lean portion of the cam and on the up stroke the projecting portion 75 of the cam acts upon the roller throwing the structures into the dotted positions indicated in Fig. VI, which, of course, relieves the file 16 by moving it towards the rear of the machine. The entire structure, owing to its connections, accommodates itself to this movement. On the down stroke the file advances to the work, as will be readily understood.

A shield 77 is disposed over the pivotal connection 7' of the arm 7 to the lower clamp 5. The oscillating mechanism just described is protected by an apron 78, the end of which is secured at 79 to the reciprocating slide 52 and is disposed over a horizontal roller 80, 81 above the said mechanism and extends downwardly on the outside where it is connected by springs 82 to the lower bolt 54 as seen in Figs. I and III. The operation and the relieving of the file or saw on its upstroke has already been explained. The adjustment thereof from a vertical to a slight incline is accomplished by the manipulation of the hand wheel 32 which acts through the worm 29 upon the worm gear 28, adjusting the disk 25 to its wrist pin 26 in the slot 24 of the link 20. This shifts the angle of the cross arm support 8 and acts through the arm 7 upon the lower clamp 5 adjusting the angle thereof accordingly, the upper portions, being in parallel relation, move correspondingly. When this is done it is necessary to free the bolts 54, 54 so that the support 53 may accommodate itself thereon. The springs 59 and 60 on the spindle 31 adjust themselves to accommodate the slight movement required. When the adjustment is completed of course the bolts 54, 54 are tightened.

The machine is driven by a pulley 83 or it may be driven directly by an electric motor.

I have described my improved filing or jig saw machine in its approved form.

I desire to state, however, that it can be considerably varied in its details without departing from my invention. The structure would operate very well without the adjustment to and from the perpendicular which I have described. When operated as a jig saw there is no necessity for relieving the saw or file on the upstroke which is especially desirable when a hack saw is used. From these statements the modifications will be readily understood in this behalf.

Having thus described my invention, what I claim as new and desire to secure by Letters Patent, is:

1. In a structure of the class described, the combination with a suitable base and rigid supporting frame arm, of upper and lower clamps, parallel arms extending from the said clamps and connected at their rear ends by a cross-shaped connecting arm, a vertical upwardly projecting arm parallel to the cross-shaped connecting arm with a parallel link connecting the upper end thereof to the said upper clamp, a horizontal link slotted at its forward end disposed parallel to the cross arm of the said connecting arm and pivoted at its rear end to the said frame arm, upwardly extending parallel links connecting the cross portion of the said cross arm to the said horizontal link, an adjusting disk with a wrist pin engaging the said slot supported on a suitable shaft stub in the said frame arm, a worm gear on the said shaft, a worm for adjusting the same with an axially disposed rod extending to the front of the said machine, a vertical guiding recess in the upper end of the said frame arm, a guiding slideway adjustable therein, a slide bar for the said upper clamp playing freely in the said adjustable slideway, a spring holding said slide bar yieldingly towards the front of the machine, a downwardly depending shank from the said lower clamp, a driving disk with a peripheral cam and adjustable wrist pin, a pitman connecting the said wrist pin to the said shank, a slide connected to the said shank, a yieldingly adjustable slideway, a support for the said slideway adjustably connected to the interior of said machine, springs for holding the said slideway yieldingly towards the front of the machine, a pair of cam levers disposed on the front of said support, a lever with a cam roller to cooperate with the peripheral cam of said disk, and connections from said lever to the cam levers whereby the slideway is moved to the rear on the upstroke, coacting as specified.

2. In a structure of the class described, the combination with a suitable base and rigid supporting frame arm, of upper and lower clamps, parallel arms extending from the said clamps and connected at their rear ends by a cross-shaped connecting arm, a vertical upwardly projecting arm parallel to the cross-shaped connecting arm with a parallel link connecting the upper end thereof to the said upper clamp, a horizontal link slotted at its forward end disposed parallel to the cross arm of the said connecting arm and pivoted at its rear end to the said frame arm, upwardly extending parallel links connecting the cross portion of the said cross arm to the said horizontal link, an adjusting disk with a wrist pin engaging the said slot supported on a suitable shaft stub in the said frame arm, a worm gear on the said shaft, a worm for adjusting the same with an axially disposed rod extending to the front of the said machine, a vertical guiding recess in the upper end of the said frame arm, and adjustable guides supported in the base of the machine and in said frame arm to compensate for the adjustment of the said running gear means, coacting as specified.

3. In a structure of the class described, the combination with a suitable base and rigid supporting frame arm, of upper and lower clamps, parallel arms extending from the said clamps and connected at their rear ends by a cross-shaped connecting arm, a vertical upwardly projecting arm parallel to the cross-shaped connecting arm with a parallel link connecting the upper end thereof to the said upper clamp, a horizontal link slotted at its forward end disposed parallel to the cross arm of the said connecting arm and pivoted at its rear end to the said frame arm, upwardly extending parallel links connecting the cross portion of the said cross arm to the said horizontal link, an adjusting disk with a wrist pin engaging the said slot supported on a suitable shaft stub in the said frame arm, and means to adjust said disk, coacting as specified.

4. In a structure of the class described, the combination with a suitable base and rigid supporting frame arm, of upper and lower clamps, parallel arms extending from the said clamps and connected at their rear ends by a cross-shaped connecting arm, a vertical upwardly projecting arm parallel to the cross-shaped connecting arm with a parallel link connecting the upper end thereof to the said upper clamp, a horizontal link disposed parallel to the cross arm of the said connecting arm and pivoted at its rear end to the said frame arm, upwardly extending parallel links connecting the cross portion of the said cross arm to the said horizontal link, means to adjust said horizontal link, a worm gear on the said shaft, a worm for adjusting the same with an axially disposed rod extending to the front of the said machine, a vertical guiding recess in the upper end of the said frame arm, and adjustable guides supported in the base of the machine and in said frame arm to compensate for the adjustment of the said running gear means, coacting as specified.

5. In a structure of the class described, the combination with a suitable base and rigid supporting frame arm, of upper and lower clamps, arms and connections between said clamps with means for adjusting the same to vary the angle of the saw or file, a vertical guiding recess in the upper end of the said frame arm, a guiding slideway adjustable therein, a slide bar shank for the said upper clamp playing freely in the said adjustable slideway, a spring holding said guide bar yieldingly towards the front of the machine, a downwardly depending shank from the said lower clamp, a driving disk with a peripheral cam, an adjustable wrist pin, a pitman connecting the said wrist pin to the said shank, a slide connected to the said shank, a yieldingly adjustable slideway, a support for the said slideway adjustably connected to the interior of said machine, springs for holding the said slideway yieldingly towards the front of the machine, a pair of cam levers disposed on the front of said support, a lever with a cam roller to cooperate with the peripheral cam of said disk, and connections from said lever to the cam levers whereby the slideway is moved to the rear on the upstroke, coacting as specified.

6. In a structure of the class described, the combination with a suitable base and rigid supporting frame arm, of upper and lower clamps, arms and connections between said clamps, a guiding slideway carried by said arm, a slide bar shank for the said upper clamp playing freely in the said adjustable slideway, a spring holding said guide bar yieldingly towards the front of the machine, a downwardly depending shank from the said lower clamp, a driving disk with a peripheral cam and wrist pin, a pitman connecting the said wrist pin to the said shank, a slide connected to the said shank, a yieldingly adjustable slideway, a support for the said slideway connected to the interior of said machine, springs for holding the said slideway yieldingly towards the front of the machine, a pair of cam levers disposed on the front of said support, a lever with a cam roller to cooperate with the peripheral cam of said disk, and connections from said lever to the cam levers whereby the slideway is moved to the rear on the upstroke, coacting as specified.

7. In a structure of the class described, the combination with a suitable base and rigid supporting frame arm, of upper and lower clamps, arms and connections between said clamps with means for adjusting the same to vary the angle of the saw or file, a vertical guiding recess in the upper end of the said frame arm, a guiding slideway adjustable therein, a slide bar shank for the said upper clamp playing freely in the said adjustable slideway, a spring holding said guide bar yieldingly towards the front of the machine, a downwardly depending shank from the said lower clamp, a driving disk with a peripheral cam and wrist pin, a pitman connecting the said wrist pin to the said shank, a slide connected to the said shank, a yieldingly adjustable slideway, a support for the said slideway adjustably connected to the interior of said machine, springs for holding the said slideway yieldingly towards the front of the machine, a pair of cam levers disposed on the front of said support, a lever with a cam roller to cooperate with the peripheral cam of said disk, and connections from said lever to the cam levers whereby the slideway is moved to the rear on the upstroke, coacting as specified.

8. In a structure of the class described, the combination with the upper and lower clamps, of a pair of parallel arms, the front ends pivoted to the said clamps and the rear ends pivoted to a supporting cross arm, an upwardly extending cross bar parallel to the said supporting cross arm, and a link parallel to the said arms connecting the upwardly projecting end of said cross arm to the upper clamp to maintain the same in parallel relation.

9. In a structure of the class described, the combination of the frame with a cross-shaped supporting cross arm, upper and lower clamps, a pair of parallel arms, the front ends pivoted to the said clamps and the rear ends pivoted to a cross-shaped supporting cross arm, and vertical parallel links carrying the said supporting cross arm.

10. In a structure of the class described, the combination of the frame with a cross-shaped supporting cross arm, upper and lower clamps, a pair of parallel arms, the front ends pivoted to the said clamps and the rear ends pivoted to a cross-shaped supporting cross arm, vertical parallel links carrying the said supporting cross arm, a horizontal link connecting the said vertical links containing a longitudinal slot, a disk with a wrist pin arranged in said slot, a worm gear connected to said disk to actuate the same, and an adjusting worm with connections to the front of the machine to vary the angle thereof.

11. In a structure of the class described, the combination of the frame with a cross-shaped supporting cross arm, upper and lower clamps, a pair of parallel arms, the front ends pivoted to the said clamps and the rear ends pivoted to a cross-shaped supporting cross arm, vertical parallel links carrying the said supporting cross arm, a horizontal link connecting the said vertical links containing a longitudinal slot, a disk with a wrist pin arranged in said slot, and means for adjusting the disk.

12. In a structure of the class described, the combination of the frame with a cross-shaped supporting cross arm, upper and lower clamps, a pair of parallel arms, the front ends pivoted to the said clamps and the rear ends pivoted to a cross-shaped supporting cross arm, vertical parallel links carrying the said supporting cross arm, and means for adjusting said parallel links to vary the tilt of the clamps.

13. In a structure of the class described comprising upper and lower clamps, the combination with the upper clamp, of an arm connected thereto, and a link connection to the said clamp parallel to the said arm with pivotal connections for maintaining the same in parallel relation whereby the clamp is maintained upright.

14. In a machine of the class described, the combination with the lower clamp, of a shank therefor with a suitable guiding slide connected thereto, a driving disk with peripheral cam, and a pitman connection therefrom to the said clamp, an adjustable yielding slideway for the slide of said clamp, an adjustable support for the said slideway with a suitable recess for the said slideway permitting front and rear movement thereof, springs disposed in the said support to hold the slideway toward the front of the machine, cam levers to the rear to react and move the said support towards the rear of the machine, a lever connected to the said cam levers with a suitable cam roller to cooperate with the peripheral cam of the said disk whereby the clamp is relieved on its return stroke and carried to the work on the cutting stroke.

15. In a machine of the class described, the combination with the lower clamp, of a shank therefor with a suitable guiding slide connected thereto, a driving disk with peripheral cam and a pitman connection therefrom to the said clamp, a support for the said slideway with a suitable recess for the said slideway permitting front and rear movement thereof, springs disposed in the said support to hold the slideway toward the front of the machine, cam levers to the rear to react and move the said support towards the rear of the machine, a lever connected to the said cam levers with a suitable cam roller to cooperate with the peripheral cam of the said disk whereby the clamp is relieved on its return stroke and carried to the work on the cutting stroke.

In witness whereof I have hereunto set my hand.

BENSON A. YARRINGTON.